US008386381B1

(12) United States Patent
Barton et al.

(10) Patent No.: US 8,386,381 B1
(45) Date of Patent: Feb. 26, 2013

(54) METHOD AND SYSTEM FOR DETECTING, MONITORING AND ADDRESSING DATA COMPROMISES

(75) Inventors: Thomas C. Barton, Newark, DE (US); Sandhya Kumar, Hockessin, DE (US); Charu Mehta, Glen Mills, PA (US); Harold Paulson, Jr., Chadds Ford, PA (US); Geetha Vaidyanathan, Landenberg, PA (US); Jiun-Ming Wu, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 379 days.

(21) Appl. No.: 12/639,415

(22) Filed: Dec. 16, 2009

(51) Int. Cl.
*G06Q 40/00* (2006.01)
(52) U.S. Cl. .................................. 705/39; 705/35
(58) Field of Classification Search ............ 705/39
See application file for complete search history.

(56) References Cited

U.S. PATENT DOCUMENTS

| 4,321,672 A | 3/1982 | Braun et al. |
| 4,355,372 A | 10/1982 | Goldberg |
| 4,491,725 A | 1/1985 | Pritchard |
| 4,495,018 A | 1/1985 | Vohrer |
| 4,633,397 A | 12/1986 | Macco |
| 4,694,397 A | 9/1987 | Vignola |
| 4,722,054 A | 1/1988 | Fukushima |
| 4,745,468 A | 5/1988 | Von Kohorn |
| 4,752,676 A | 6/1988 | Leonard et al. |
| 4,752,877 A | 6/1988 | Roberts et al. |
| 4,774,664 A | 9/1988 | Gottardy |
| 4,797,911 A | 1/1989 | Marks |
| 4,812,628 A | 3/1989 | Boston |
| 4,914,587 A | 4/1990 | Clouse |
| 4,926,255 A | 5/1990 | Von Kohorn |
| 4,932,046 A | 6/1990 | Ross |

(Continued)

FOREIGN PATENT DOCUMENTS

| JP | 7-152960 | 6/1995 |
| JP | 2007-088822 | 4/2007 |

(Continued)

OTHER PUBLICATIONS

Delivering the Right Information to the Right Resource or Every Customer Interaction; Intelligent Callrouter, www.geotel.com/ solutions/icr/default/htm, 1 page, (1998).

(Continued)

*Primary Examiner* — Jagdish Patel
*Assistant Examiner* — Kevin Poe
(74) *Attorney, Agent, or Firm* — Hunton & Williams LLP

(57) ABSTRACT

According to an embodiment of the present invention, an automated computer implemented method for detecting one or more data compromises comprises the steps of detecting an activity indicative of a data compromise based at least in part on a compromise detection report involving at least one of merchant compromise report, region compromise report and acquirer compromise report, wherein the compromise detection report is generated by an automated detection algorithm; classifying the activity based on a combination of risk level, size of data compromise and fraud severity; and identifying a specific mitigation response to the activity through an interface. Another embodiment of the present invention determines whether one or more accounts associated with the activity have been probed or tested by a fraudster to determine if the one or more accounts are valid.

21 Claims, 9 Drawing Sheets

U.S. PATENT DOCUMENTS

| | | |
|---|---|---|
| 4,948,174 A | 8/1990 | Thomson et al. |
| 4,972,504 A | 11/1990 | Daniel, Jr. |
| 4,974,878 A | 12/1990 | Josephson |
| 5,025,372 A | 6/1991 | Burton et al. |
| 5,041,972 A | 8/1991 | Frost |
| 5,050,207 A | 9/1991 | Hitchcock |
| 5,121,945 A | 6/1992 | Thomson et al. |
| 5,122,950 A | 6/1992 | Mee |
| 5,157,717 A | 10/1992 | Hitchcock |
| 5,175,682 A | 12/1992 | Higashiyama |
| 5,179,584 A | 1/1993 | Tsumura |
| 5,220,501 A | 6/1993 | Lawlor |
| 5,225,978 A | 7/1993 | Petersen et al. |
| 5,237,620 A | 8/1993 | Deaton |
| 5,239,642 A | 8/1993 | Gutierrez et al. |
| 5,259,023 A | 11/1993 | Katz |
| 5,260,778 A | 11/1993 | Kauffman |
| 5,262,941 A | 11/1993 | Saladin |
| 5,287,269 A | 2/1994 | Dorrough et al. |
| 5,311,594 A | 5/1994 | Penzias |
| 5,326,959 A | 7/1994 | Perazza |
| 5,361,201 A | 11/1994 | Jost et al. |
| 5,383,113 A | 1/1995 | Kight |
| 5,402,474 A | 3/1995 | Miller |
| 5,424,938 A | 6/1995 | Wagner |
| 5,430,644 A | 7/1995 | Deaton et al. |
| 5,448,471 A | 9/1995 | Deaton et al. |
| 5,465,206 A | 11/1995 | Hilt et al. |
| 5,483,444 A | 1/1996 | Malark |
| 5,483,445 A | 1/1996 | Pickering |
| 5,490,060 A | 2/1996 | Malec |
| 5,513,102 A | 4/1996 | Auriemma |
| 5,523,942 A | 6/1996 | Tyler |
| 5,532,920 A | 7/1996 | Hartrick |
| 5,537,314 A | 7/1996 | Kanter |
| 5,550,734 A | 8/1996 | Tarter |
| 5,555,299 A | 9/1996 | Maloney et al. |
| 5,559,855 A | 9/1996 | Dowens et al. |
| 5,561,707 A | 10/1996 | Katz |
| 5,570,465 A | 10/1996 | Tsakanikas |
| 5,583,759 A | 12/1996 | Geer |
| 5,594,791 A | 1/1997 | Szlam et al. |
| 5,599,528 A | 2/1997 | Igaki |
| 5,615,341 A | 3/1997 | Srikant |
| 5,621,812 A | 4/1997 | Deaton et al. |
| 5,631,828 A | 5/1997 | Hagan |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,652,786 A | 7/1997 | Rogers |
| 5,659,165 A | 8/1997 | Jennings |
| 5,659,469 A | 8/1997 | Deaton et al. |
| 5,684,863 A | 11/1997 | Katz |
| 5,687,322 A | 11/1997 | Deaton et al. |
| 5,689,100 A | 11/1997 | Carrithers et al. |
| 5,699,527 A | 12/1997 | Davidson |
| 5,699,528 A | 12/1997 | Hogan |
| 5,704,044 A | 12/1997 | Tarter et al. |
| 5,710,889 A | 1/1998 | Clark et al. |
| 5,715,298 A | 2/1998 | Rogers |
| 5,715,450 A | 2/1998 | Ambrose |
| 5,727,249 A | 3/1998 | Pollin |
| 5,734,838 A | 3/1998 | Robinson |
| 5,742,775 A | 4/1998 | King |
| 5,745,706 A | 4/1998 | Wolfberg et al. |
| 5,757,904 A | 5/1998 | Anderson |
| 5,758,126 A | 5/1998 | Daniels et al. |
| 5,761,647 A | 6/1998 | Boushy |
| 5,765,142 A | 6/1998 | Allred et al. |
| 5,787,403 A | 7/1998 | Randle |
| 5,793,846 A | 8/1998 | Katz |
| 5,794,221 A | 8/1998 | Egendorf |
| 5,802,498 A | 9/1998 | Comesanas |
| 5,802,499 A | 9/1998 | Sampson et al. |
| 5,815,551 A | 9/1998 | Katz |
| 5,819,238 A | 10/1998 | Fernholz |
| 5,826,241 A | 10/1998 | Stein |
| 5,832,447 A | 11/1998 | Rieker |
| 5,832,457 A | 11/1998 | O'Brien |
| 5,832,460 A | 11/1998 | Bednar |
| 5,835,087 A | 11/1998 | Herz |
| 5,835,580 A | 11/1998 | Fraser |
| 5,835,603 A | 11/1998 | Coutts |
| 5,842,211 A | 11/1998 | Horadan |
| 5,852,811 A | 12/1998 | Atkins |
| 5,862,223 A | 1/1999 | Walker |
| 5,870,456 A | 2/1999 | Rogers |
| 5,870,721 A | 2/1999 | Norris |
| 5,870,724 A | 2/1999 | Lawlor |
| 5,873,072 A | 2/1999 | Kight |
| 5,875,437 A | 2/1999 | Atkins |
| 5,884,032 A | 3/1999 | Bateman |
| 5,884,288 A | 3/1999 | Chang |
| 5,890,140 A | 3/1999 | Clark et al. |
| 5,897,625 A | 4/1999 | Gustin |
| 5,899,982 A | 5/1999 | Randle |
| 5,903,881 A | 5/1999 | Schrader |
| 5,920,847 A | 7/1999 | Kolling et al. |
| 5,923,745 A | 7/1999 | Hurd |
| 5,940,811 A | 8/1999 | Norris |
| 5,943,656 A | 8/1999 | Crooks |
| 5,949,044 A | 9/1999 | Walker et al. |
| 5,953,406 A | 9/1999 | LaRue et al. |
| 5,966,695 A | 10/1999 | Melchione et al. |
| 5,966,698 A | 10/1999 | Pollin |
| 5,970,467 A | 10/1999 | Alavi |
| 5,970,480 A | 10/1999 | Kalina |
| 5,974,396 A | 10/1999 | Anderson |
| 5,978,780 A | 11/1999 | Watson |
| 5,987,434 A | 11/1999 | Libman |
| 5,987,435 A | 11/1999 | Weiss et al. |
| 5,991,736 A | 11/1999 | Ferguson et al. |
| 5,991,750 A | 11/1999 | Watson |
| 5,995,942 A | 11/1999 | Smith et al. |
| 5,995,948 A | 11/1999 | Whitford |
| 6,006,205 A | 12/1999 | Loeb et al. |
| 6,006,207 A | 12/1999 | Mumick et al. |
| 6,009,415 A | 12/1999 | Shurling et al. |
| 6,016,344 A | 1/2000 | Katz |
| 6,016,482 A | 1/2000 | Molinari et al. |
| 6,018,718 A | 1/2000 | Walker et al. |
| 6,018,722 A | 1/2000 | Ray et al. |
| 6,026,370 A | 2/2000 | Jermyn |
| 6,029,139 A | 2/2000 | Cunningham et al. |
| 6,029,153 A | 2/2000 | Bauchner et al. |
| 6,032,125 A | 2/2000 | Ando |
| 6,032,136 A | 2/2000 | Brake, Jr. et al. |
| 6,038,552 A | 3/2000 | Fleischl et al. |
| 6,049,782 A | 4/2000 | Gottesman et al. |
| 6,055,510 A | 4/2000 | Henrick |
| 6,058,378 A | 5/2000 | Clark et al. |
| 6,067,533 A | 5/2000 | McCauley et al. |
| 6,070,147 A | 5/2000 | Harms et al. |
| 6,076,072 A | 6/2000 | Libman |
| 6,078,892 A | 6/2000 | Anderson et al. |
| 6,088,685 A | 7/2000 | Kiron et al. |
| 6,098,052 A | 8/2000 | Kosiba et al. |
| 6,100,891 A | 8/2000 | Thorne |
| 6,101,486 A | 8/2000 | Roberts et al. |
| 6,105,007 A | 8/2000 | Norris |
| 6,112,190 A | 8/2000 | Fletcher et al. |
| 6,128,599 A | 10/2000 | Walker et al. |
| 6,134,563 A | 10/2000 | Clancey et al. |
| 6,141,666 A | 10/2000 | Tobin |
| 6,148,293 A | 11/2000 | King |
| 6,151,584 A | 11/2000 | Papierniak et al. |
| 6,157,924 A | 12/2000 | Austin |
| 6,182,059 B1 | 1/2001 | Angotti et al. |
| 6,189,787 B1 | 2/2001 | Dorf |
| 6,195,644 B1 | 2/2001 | Bowie |
| 6,212,178 B1 | 4/2001 | Beck et al. |
| 6,222,914 B1 | 4/2001 | McMullin |
| 6,226,623 B1 | 5/2001 | Schein et al. |
| 6,230,287 B1 | 5/2001 | Pinard et al. |
| 6,233,332 B1 | 5/2001 | Anderson et al. |
| 6,233,566 B1 | 5/2001 | Levine et al. |

| | | |
|---|---|---|
| 6,243,688 B1 | 6/2001 | Kalina |
| 6,267,292 B1 | 7/2001 | Walker et al. |
| 6,278,981 B1 | 8/2001 | Dembo et al. |
| 6,278,996 B1 | 8/2001 | Richardson et al. |
| 6,292,786 B1 | 9/2001 | Deaton et al. |
| 6,292,789 B1 | 9/2001 | Schutzer |
| 6,301,567 B1 | 10/2001 | Leong et al. |
| 6,304,653 B1 | 10/2001 | O'Neil et al. |
| 6,304,858 B1 | 10/2001 | Mosler et al. |
| 6,321,212 B1 | 11/2001 | Lange |
| 6,324,524 B1 | 11/2001 | Lent et al. |
| 6,327,573 B1 | 12/2001 | Walker et al. |
| 6,330,543 B1 | 12/2001 | Kepecs |
| 6,338,047 B1 | 1/2002 | Wallman |
| 6,349,290 B1 | 2/2002 | Horowitz et al. |
| 6,385,594 B1 | 5/2002 | Lebda et al. |
| 6,393,409 B2 | 5/2002 | Young et al. |
| 6,405,179 B1 | 6/2002 | Rebane |
| 6,405,181 B2 | 6/2002 | Lent et al. |
| 6,411,947 B1 | 6/2002 | Rice et al. |
| 6,415,267 B1 | 7/2002 | Hagan |
| 6,418,419 B1 | 7/2002 | Nieboer et al. |
| 6,424,949 B1 | 7/2002 | Deaton et al. |
| 6,430,545 B1 | 8/2002 | Honarvar et al. |
| 6,456,983 B1 | 9/2002 | Keyes et al. |
| 6,480,850 B1 | 11/2002 | Veldhuisen |
| 6,513,019 B2 | 1/2003 | Lewis |
| 6,553,113 B1 | 4/2003 | Dhir et al. |
| 6,567,791 B2 | 5/2003 | Lent et al. |
| 6,578,015 B1 | 6/2003 | Haseltine et al. |
| 6,606,744 B1 | 8/2003 | Mikurak |
| 6,609,113 B1 | 8/2003 | O'Leary et al. |
| 6,658,393 B1 | 12/2003 | Basch et al. |
| 6,704,714 B1 | 3/2004 | O'Leary et al. |
| 6,718,388 B1 | 4/2004 | Yarborough et al. |
| 6,804,346 B1 | 10/2004 | Mewhinney |
| 6,823,319 B1 | 11/2004 | Lynch et al. |
| 6,865,547 B1 | 3/2005 | Brake, Jr. et al. |
| 6,968,319 B1 | 11/2005 | Remington et al. |
| 6,970,830 B1 | 11/2005 | Samra et al. |
| 6,988,082 B1 | 1/2006 | Williams et al. |
| 6,999,938 B1 | 2/2006 | Libman |
| 7,068,832 B1 | 6/2006 | Price et al. |
| 7,139,729 B2 | 11/2006 | Nault |
| 7,143,174 B2 | 11/2006 | Miller et al. |
| 7,155,614 B2 | 12/2006 | Ellmore |
| 7,174,302 B2 | 2/2007 | Patricelli et al. |
| 7,206,768 B1 | 4/2007 | deGroeve et al. |
| 7,272,857 B1 | 9/2007 | Everhart |
| 7,310,618 B2 | 12/2007 | Libman |
| 7,353,383 B2 | 4/2008 | Skingle |
| 7,406,426 B1 | 7/2008 | Pletz |
| 7,444,672 B2 | 10/2008 | Ellmore |
| 7,461,265 B2 | 12/2008 | Ellmore |
| 7,472,171 B2 | 12/2008 | Miller et al. |
| 7,480,631 B1 | 1/2009 | Merced et al. |
| 7,580,890 B2 | 8/2009 | Siegel et al. |
| 7,587,763 B2 * | 9/2009 | Yodaiken ............ 726/23 |
| 8,032,936 B2 * | 10/2011 | Yodaiken ............ 726/23 |
| 2001/0032158 A1 | 10/2001 | Starkman |
| 2001/0032159 A1 | 10/2001 | Starkman |
| 2001/0032176 A1 | 10/2001 | Starkman |
| 2001/0034663 A1 | 10/2001 | Teveler et al. |
| 2001/0034682 A1 | 10/2001 | Knight et al. |
| 2001/0042034 A1 | 11/2001 | Elliott |
| 2001/0044293 A1 | 11/2001 | Morgan |
| 2001/0044762 A1 | 11/2001 | Nault |
| 2001/0047342 A1 | 11/2001 | Cuervo |
| 2001/0047489 A1 | 11/2001 | Ito et al. |
| 2001/0054003 A1 | 12/2001 | Chien et al. |
| 2001/0056390 A1 | 12/2001 | Varadarajan et al. |
| 2002/0007313 A1 | 1/2002 | Mai et al. |
| 2002/0026394 A1 | 2/2002 | Savage et al. |
| 2002/0059141 A1 | 5/2002 | Davies et al. |
| 2002/0120570 A1 | 8/2002 | Loy |
| 2002/0194126 A1 | 12/2002 | Randell et al. |
| 2003/0101119 A1 | 5/2003 | Parsons et al. |
| 2003/0105981 A1 | 6/2003 | Miller et al. |
| 2003/0163403 A1 | 8/2003 | Chen et al. |
| 2003/0208441 A1 | 11/2003 | Poplawski et al. |
| 2003/0216997 A1 | 11/2003 | Cohen |
| 2003/0233321 A1 | 12/2003 | Scolini et al. |
| 2004/0024693 A1 | 2/2004 | Lawrence |
| 2004/0078328 A1 | 4/2004 | Talbert et al. |
| 2004/0123137 A1 * | 6/2004 | Yodaiken ............ 713/200 |
| 2004/0200898 A1 | 10/2004 | Kepecs |
| 2004/0230483 A1 | 11/2004 | Kepecs |
| 2004/0236688 A1 | 11/2004 | Bozeman |
| 2004/0252823 A1 | 12/2004 | Becerra et al. |
| 2004/0255223 A1 * | 12/2004 | Chawla ............ 714/763 |
| 2005/0091138 A1 | 4/2005 | Awatsu |
| 2005/0102212 A1 | 5/2005 | Roy |
| 2006/0036553 A1 | 2/2006 | Gupta et al. |
| 2008/0027841 A1 | 1/2008 | Eder |
| 2008/0052328 A1 * | 2/2008 | Widhelm et al. ............ 707/204 |
| 2008/0121696 A1 | 5/2008 | Mock et al. |
| 2008/0304431 A1 | 12/2008 | Karaoguz |
| 2009/0261162 A1 * | 10/2009 | Kargman et al. ............ 235/380 |
| 2010/0011444 A1 * | 1/2010 | Yodaiken ............ 726/26 |
| 2010/0281223 A1 * | 11/2010 | Wolfe et al. ............ 711/133 |

FOREIGN PATENT DOCUMENTS

WO      WO 01/86524      11/2001

OTHER PUBLICATIONS

Friedman, Dictionary of Business Terms, Third Edition, (2000).
Forbes, S I Eve, Fact and Comment, ProQuest, vol. 170, Issue 6, Sep. 30, 2002.
Global Corruption Report 2004, Transparency International, Pluto Press, www.globalcorrupt, ISBN 07453 2231, Jun. 26, 2005.
Rial, Astrid, How to Monitor Collectors, Credit Card Management, Jul. 2000, vol. 13, Iss. 3:p. 65, 4 pages.
Keep the Change Savings Service, Bank of America, Retrieved from the internet on Jan. 27, 2006 at <https://www.bankofamerica.com/deposits/checksave/apps/ktc/ktc_terms.cfm>.
Computer Telephony Solutions, The Customer Interaction Specialists, Computer Telephony Solutions, Internet, May 25, 1999.

* cited by examiner

Merchant Compromise Detection Report 510

| MRCH_ID 512 | MRCH_DO_BUS_AS_NM 514 | SALES_CARD_CNT 516 | frd_card_cnt 518 | frd_loss 520 | avg_frd_loss 522 | Account fraud rate |
|---|---|---|---|---|---|---|
| 106 | REPAIR SHOP | 591 | 19 | $ 12,247 | $ 645 | 3% |
| 056 | BOB'S DINER | 1535 | 32 | $ 38,127 | $ 1,191 | 2% |
| 720 | HARDWARE STORE | 478 | 19 | $ 6,049 | $ 318 | 4% |
| 254 | SHOE SHINE | 662 | 29 | $ 15,334 | $ 529 | 4% |
| 200 | BISTRO | 356 | 29 | $ 26,895 | $ 927 | 8% |
| 295 | ICE CREAM | 1278 | 27 | $ 17,614 | $ 652 | 2% |
| 952 | BOOKSTORE | 1746 | 41 | $ 18,776 | $ 458 | 2% |
| 800 | HIGH-END DRESSES | 297 | 23 | $ 11,653 | $ 507 | 8% |
| 996 | BATH STORE | 795 | 19 | $ 6,505 | $ 342 | 2% |
| 888 | NIGHTCLUB | 197 | 28 | $ 9,305 | $ 332 | 14% |

FIGURE 5

Country Compromise Detection Report - 700

| Country Risk Group 710 | Country 712 | SALES_MONTH 714 | Fraud Indicator 716 | | Grand Total 718 | Account Fraud Rate - 720 |
|---|---|---|---|---|---|---|
| | | | 0 | 1 | | |
| | | 2009/04 | 8,916 | 71 | 8,987 | 0.79% |
| | | 2009/05 | 10,581 | 38 | 10,619 | 0.36% |
| COUNTRY A Total | | | 106,486 | 3,314 | 109,800 | 3.02% |
| | COUNTRY B | 2008/05 | 4,545 | 1,166 | 5,711 | 20.42% |
| | | 2008/06 | 5,027 | 551 | 5,578 | 9.88% |
| | | 2008/07 | 6,140 | 171 | 6,311 | 2.71% |
| | | 2008/08 | 5,799 | 146 | 5,945 | 2.46% |
| | | 2008/09 | 3,183 | 89 | 3,272 | 2.72% |
| | | 2008/10 | 3,703 | 99 | 3,802 | 2.60% |
| | | 2008/11 | 4,303 | 131 | 4,434 | 2.95% |
| | | 2008/12 | 4,979 | 160 | 5,139 | 3.11% |
| | | 2009/01 | 5,831 | 146 | 5,977 | 2.44% |
| | | 2009/02 | 5,730 | 106 | 5,836 | 1.82% |
| | | 2009/03 | 7,317 | 197 | 7,514 | 2.62% |
| | | 2009/04 | 7,162 | 68 | 7,230 | 0.94% |
| | | 2009/05 | 7,153 | 26 | 7,179 | 0.36% |
| COUNTRY B Total | | | 70,872 | 3,056 | 73,928 | 4.13% |
| | COUNTRY C | 2008/05 | 7,942 | 237 | 8,179 | 2.90% |
| | | 2008/06 | 7,505 | 260 | 7,765 | 3.35% |
| | | 2008/07 | 8,569 | 273 | 8,842 | 3.09% |
| | | 2008/08 | 8,371 | 250 | 8,621 | 2.90% |
| | | 2008/09 | 7,387 | 251 | 7,638 | 3.29% |

FIGURE 7

Acquirer Compromise Detection Report 900

| | ACQ_BIN_NB 910 | FRAUD RATE 912 | | | | | NUMBER OF FRAUD ACCOUNTS 914 | | | | |
|---|---|---|---|---|---|---|---|---|---|---|---|
| | | 2009/01 | 2009/02 | 2009/03 | 2009/04 | 2009/05 | 2009/01 | 2009/02 | 2009/03 | 2009/04 | 200905 |
| 1 | 900 | 1.90% | 1.56% | 1.13% | 0.79% | 0.45% | 98279 | 76732 | 63784 | 45331 | 27395 |
| 2 | 500 | 1.88% | 1.53% | 1.12% | 0.79% | 0.46% | 88947 | 69341 | 56898 | 41364 | 25367 |
| 3 | 733 | 1.88% | 1.55% | 1.13% | 0.79% | 0.46% | 74511 | 59290 | 50050 | 36591 | 22070 |
| 4 | 443 | 2.05% | 1.67% | 1.23% | 0.86% | 0.50% | 59864 | 47179 | 40006 | 28851 | 17967 |
| 5 | 216 | 1.29% | 1.05% | 0.80% | 0.56% | 0.33% | 51394 | 38995 | 34228 | 25870 | 16512 |
| 6 | 105 | 2.28% | 1.84% | 1.36% | 0.97% | 0.56% | 45277 | 35851 | 31013 | 23221 | 14595 |
| 7 | 501 | 1.71% | 1.39% | 1.01% | 0.70% | 0.40% | 47826 | 36346 | 31234 | 23089 | 14090 |
| 8 | 301 | 2.28% | 1.86% | 1.37% | 0.96% | 0.56% | 42243 | 33622 | 29108 | 21436 | 13383 |
| 9 | 300 | 2.30% | 1.86% | 1.38% | 0.97% | 0.57% | 42294 | 32991 | 28608 | 20845 | 12964 |
| 10 | 705 | 2.24% | 1.84% | 1.34% | 0.95% | 0.55% | 39735 | 31639 | 26930 | 19465 | 11909 |

FIGURE 9

METHOD AND SYSTEM FOR DETECTING, MONITORING AND ADDRESSING DATA COMPROMISES

FIELD OF THE INVENTION

The present invention relates generally to detecting, monitoring and addressing data compromises, and more specifically to detecting data compromises, as applied to credit card fraud and other types of fraud, in a faster and more efficient manner.

BACKGROUND OF THE INVENTION

Currently, fraud detection is a complex and manually intensive process that involves culling through billions of transactions to identify activities. Fraud is difficult to detect. Fraud detection is not an exact science and oftentimes transactions from good customers are declined in the process, thereby negatively impacting customer relations. The timeliness of fraud detection is also a major concern. If fraudulent activities are not detected early enough, fraudsters can make a major impact and cause substantial losses to customers, merchants, financial institutions and other entities.

Network intrusions and database attacks are larger, more frequent and more sophisticated. Data compromises are costing an exemplary financial institution and other players from $3 million to $25 million, and usually more, in gross fraud per month.

Oftentimes, fraud is only detected after the compromise has cost card members, merchants, card associations, and/or financial institutions millions of dollars.

Other drawbacks may also be present.

SUMMARY OF THE INVENTION

Accordingly, one aspect of the invention is to address one or more of the drawbacks set forth above. According to an embodiment of the present invention, a method for detecting one or more data compromises, wherein the method is executed by a programmed computer processor which communicates with a user via a network, comprises the steps of detecting an activity indicative of a data compromise based at least in part on a compromise detection report involving at least one of merchant compromise report, region compromise report and acquirer compromise report, wherein the compromise detection report is generated by an automated detection algorithm; classifying the activity based on a combination of risk level, size of data compromise and fraud severity; and identifying a specific mitigation response to the activity through an interface.

According to an exemplary embodiment of the present invention, an automated computer implemented method and system for detecting one or more data compromises further comprises determining whether one or more accounts associated with the activity have been probed by a fraudster to determine if the one or more accounts are valid; wherein the merchant compromise report identities one or more common merchants where authorizations were swiped with one or more counterfeit cards; wherein an account fraud rate is calculated for each common merchant, wherein the account fraud rate represents a number of counterfeit fraud accounts as compared to a total of accounts transacted at a merchant; wherein the merchant compromise report identifies merchant identifier, sales card count, fraud card count, fraud loss and account fraud rate; wherein the region compromise report identifies one or more non-U.S. countries having an increase in account fraud rate for a predetermined time period; wherein one or more card transactions that have turned fraud during a predetermined time period occurred in the identified one or more countries; wherein the region compromise report identifies region risk group, one or more non-U.S. countries, fraud indicator and account fraud rate; wherein the acquirer compromise report identities one or more common acquirers with authorizations involving one or more fraud card numbers; wherein the acquirer compromise report identifies acquirer identifier, sales time period and fraud data.

According to an exemplary embodiment of the present invention, a computer implemented system for detecting one or more data compromises comprises a detection module for detecting an activity indicative of a data compromise based at least in part on a compromise detection report involving at least one of merchant compromise report, region compromise report and acquirer compromise report, wherein the compromise detection report is generated by an automated detection algorithm; a classification module for classifying the activity based on a combination of risk level, size of data compromise and fraud severity; and a mitigation module for identifying a specific mitigation response to the activity through an interface.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary interface illustrating a merchant compromise detection report, according to an embodiment of the present invention.

FIG. 7 is an exemplary interface illustrating a region compromise detection report, according to an embodiment of the present invention.

FIG. 9 is an exemplary interface illustrating an acquirer compromise detection report, according to an embodiment of the present invention.

DETAILED DESCRIPTION OF EXEMPLARY EMBODIMENT(S)

Figure 1:
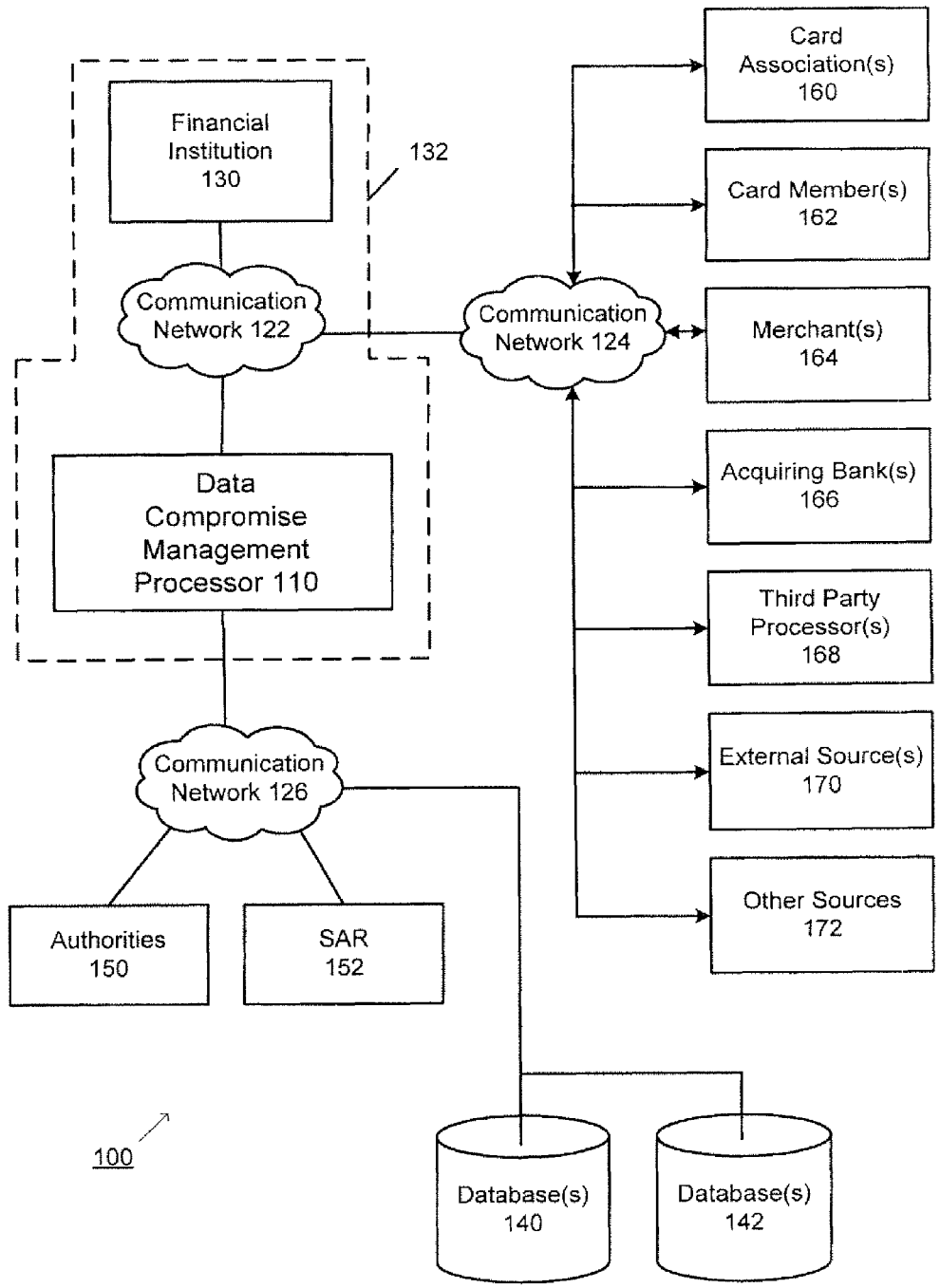
FIG. 1 is an exemplary diagram of a system for monitoring and/or detecting data compromises as applied to a financial situation, according to an embodiment of the present invention.

An embodiment of the present invention improves the efficiency of identifying potential fraudulent activities. An embodiment of the present invention is directed to detecting data compromises in a faster and more efficient manner. Another embodiment of the present invention also relates to detecting probing transactions, which generally relate to testing transactions used by fraudsters to determine whether stolen data is valid and accounts targeted for fraud can be used by the fraudster.

Any common point or location either physical or virtual from where cardholder information is stolen or exposed may be considered a "compromise." For example, a data compromise generally affects card holder information, such as card number, encoded data on the magnetic stripe, security code on the card (e.g., three-digit code, four-digit code, etc.), expiration date, etc. The compromise may involve one or more various participants, such as merchant, merchant acquirer, card association, processor, third party entities, etc. The compromise may involve a common or related place or instance where data is taken or stolen by an entity.

The data compromise management process of an embodiment of the present invention may involve several steps including: (1) detection; (2) classification; (3) drilldown; (4) mitigation and (5) termination. Compromises may be detected from external sources (e.g., card associations, such as VISA, Mastercard, etc.), fraud policy (e.g., proactive compromise detection reports), case analysis team (e.g., manual account reviews) and/or other sources. Classification may involve identifying whether transactions are card-present or card-not-present, severity level, fraud loss type, etc. Drilldown may identify risk indicators, customer indicators, account indicators and/or other data. Drilldown may also involve checking for probes. Mitigation may involve declining or queuing strategy analysis, applying card watch status controls, reissuing with expiration date change only, and/or other appropriate action. Termination may involve monitoring losses, SAR filings, and/or other actions. The data compromise management process of an embodiment of the present invention may be applied to various scenarios and applications. For example, an exemplary process may detect merchant compromise, region or country compromise and acquirer compromise. An aspect of the invention may involve test cards that are inserted into the criminal market on purpose to provide information on how they move across a fraud system.

Another embodiment of the invention is directed to probe detection which may be a tool to find types of tests that are used by fraudsters to validate a compromised account. A probe may involve a testing of an account to verify that the account is valid. Probes generally involve low dollar transactions that are not posted to avoid alerting the consumer. Probes may be classified as pure probes and parasitic probes. Pure probes may involve the situation where fraudsters create a mechanism to process authorizations. Parasitic probes generally involve fraudsters abusing merchants to test probes. For example, a newspaper website may be a target for probes where fraudsters can test transactions on accounts. The probe detection aspect of an embodiment of the present invention may identify probes by recognizing low dollar transactions that are not posted, high fraud rates on an account level that occur after the probe, merchant identifiers and/or other factors and considerations.

Compromises are costing an exemplary financial institution from $3 million to $25 million in gross fraud per month. An embodiment of the present invention identifies compromises on accounts faster and more effectively thereby mitigating substantial losses caused by fraud. A goal of an embodiment of the present invention is to narrow the window from the time of data compromise to detection and mitigation of risk relative to the compromise.

While the detailed description is directed to an exemplary application involving credit card compromises, the various embodiments of the invention may be applied to other scenarios and applications involving other fraudulent activities or other activities involving detecting data compromises. Other applications may be applied in varying scope.

FIG. 1 is an exemplary diagram of a system for monitoring and/or detecting data compromises as applied to a financial situation, according to an embodiment of the present invention. The data compromise system and method of an embodiment of the present invention may be applied to other scenarios where identifying data compromises may be useful to prevent fraud, wrongful activity or other undesirable acts. Fraud may involve card-present fraud as well as card-not-present fraud. In card-present fraud, the card and/or actual data encoded on the black magnetic stripe may be compromised. In card-not-present fraud, card number, expiration date and/or CVV code (e.g., three-digit number on the back of the card) may be compromised. A fraudster with card-not-present data is more likely to use that information on Internet type transactions, phone transactions, or other key-entered transactions, etc. A fraudster with card-present data is more likely to produce counterfeit cards using that information for card-present type transaction as well as Internet, phone or other key-entered transactions. Similar measures and considerations may be taken into account for RFID transactions and/or other types of transactions.

A system 100 of an embodiment of the present invention may include a Processor 110, which may be stand alone, hosted by an entity, such as a financial institution, service provider, bank, etc. For example, Processor 110 may be affiliated or associated with a financial institution, bank and/or other entity with fraud concerns. In an exemplary embodiment involving a financial institution such as 130, the financial institution may host or support the Processor. In this example, the application of the data compromise algorithm of an embodiment of the present invention may appear to be performed by financial institution, as a single consolidated unit, as shown by 132.

According to another example, Processor 110 may be separate and distinct from Financial Institution 130. For example, Financial Institution 130, or other entity, may communicate to Processor 110 via a network or other communication mechanism, as shown by 122.

Processor 110 may access databases and/or other sources of information to identify data compromises and/or other information for effectively identifying compromises, fraudulent and potentially fraudulent events. For example, Processor 110 may access and/or maintain Database 140 and/or other database 142. Database 140 may include data, such as account information, transaction activity, payment activity, and/or other relevant data for one or more accounts. While a single database is illustrated in the exemplary figure, the system may include multiple databases at the same location or separated through multiple locations. The databases may be further combined and/or separated. In addition, the databases may be supported by Financial Institution 130 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data Compromise Management Processor 110 may communicate with various entities, including card associations 160, e.g., VISA, Mastercard, etc., Card Member(s) 162, Merchant(s) 164, Acquiring Bank(s) 166, Third Party Processor (s) 168, External Source(s) 170 and/or Other Sources 172. In addition, the entities may communicate with each other. An embodiment of the present invention may also communicate to the Authorities 150, including police, law enforcement, FBI, terrorism bureaus, government entities and/or other entities. In addition, suspicious activity report (SAR) filings may be facilitated through an embodiment of the present invention, as shown by 152. Communication may be provided by Communication Network 122, 124, 126 and/or other communication mechanism. In addition, Data Compromise Management Processor 110 may have access to other sources of data and/or data feeds that identify other metrics and/or information that may be relevant for identifying fraud activities in accordance with the various embodiments of the present invention. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Figure 2:
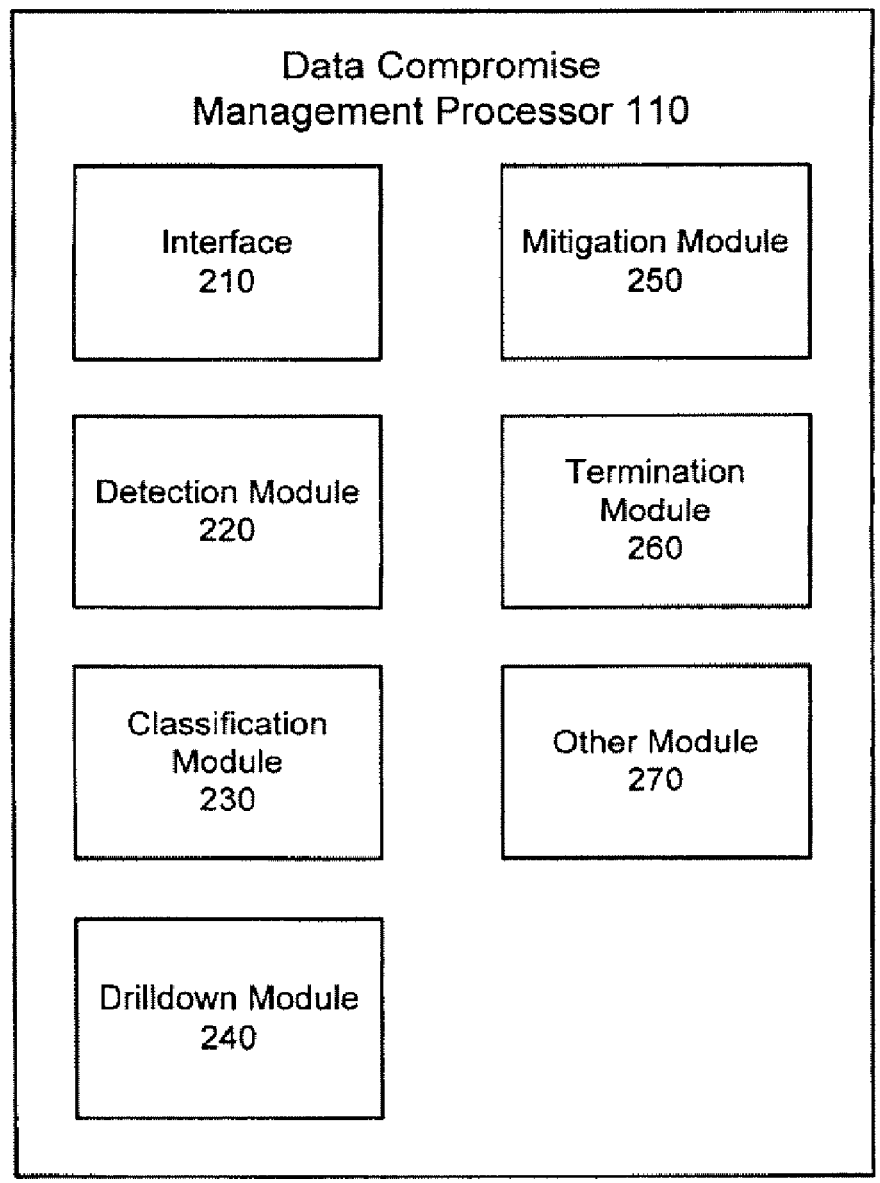
FIG. 2 is an exemplary detailed diagram of a processor for monitoring and/or detecting activity indicative of fraud, according to an embodiment of the present invention.

FIG. 2 is an exemplary detailed diagram of a processor for monitoring and/or detecting activity indicative of fraud, according to an embodiment of the present invention. For example, Data Compromise Management Processor 110 may include various modules and interfaces for analyzing data and identifying fraudulent and potentially fraudulent events, according to an embodiment of the present invention. Data Compromise Management Processor 110 may include Interface 210, Detection Module 220, Classification Module 230, Drilldown Module 240, Mitigation Module 250, Termination Module 260 and/or other modules, interfaces and/or processors, as represented by Other Module 270. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

According to another embodiment of the present invention, Data Compromise Management Processor 110 may host a website or other electronic interface, as shown by Interface 210, where users can access data as well as provide data. For example, a financial institution, merchant and/or other entity may access information through an interface to view data, submit requests, provide data and/or perform other actions.

Detection Module 220 may perform analysis in accordance with the various embodiments of the present invention to detect, monitor and/or investigate data compromises, including fraud activities. The detection aspect of an embodiment of the present invention may find one or more points in the market indicative of the data compromise. The information gathered may be data driven, information driven and/or a combination. Data driven may represent data that is currently available, such as an entity's own internal data. For example, a merchant may identify potentially fraudulent card numbers based on suspicious behavior and/or other triggers. Information driven may include data from cyber intelligence, chatter and/or other external sources. Chatter may include communication between or among fraudsters in the criminal market who are buying, selling and/or transacting stolen data. An embodiment of the present invention may identify and access data indicative of fraudulent activity.

Another aspect of an embodiment of the present invention may involve inserting known fraudulent cards into the criminal market and monitoring their usage to gather additional information to better detect fraudulent activity.

Classification Module 230 may classify the detected activity into one or more categories or metrics. For example, the detected activity may be classified based on number of cards compromised, severity level, fraud loss type on impacted accounts, card-present, card-not-present and/or other factors. Card-present involves the situation where a card holder physically swipes the card product at the merchant location. Card-not-present involves the situation where information, such as a card number, expiration date, three-digit code and/or other identifier, is provided, such as an Internet, phone or other key-entered transaction. Fraud usage analysis may also be considered. For example, merchant type, merchant geography, transaction type, valid card verification value (CVV), valid card verification code (CVC) and/or other data may be identified.

According to an exemplary embodiment, the detected activity may be classified based on size, risk, severity level and/or other metric. Size may represent the number of accounts suspected to be in a compromise. For example, a small size merchant compromise may involve less than a predetermined number of accounts, such as 150 accounts. A medium size merchant compromise may involve between 150 to 500 accounts. A large size merchant compromise may involve over 500 accounts. Other ranges and/or thresholds may be applied to designate small, medium and large size merchants. Additional categories of merchants may be applied. Risk may be based on percentage of accounts converting to fraud after the compromise. For example, a high risk may be defined as greater than 25% account fraud rate. A medium risk may be defined as being between 15%-25% account fraud rate. A low risk may be defined as less than 15% account fraud rate. Other percentages may be applied to represent varying degrees of risk. Severity level may be based on a combination of size and risk. Other metrics for classifying the activity may be applied as well.

Drilldown Module 240 may involve analyzing additional variables, triggers and/or other factors. This may be particularly useful for medium risk and/or medium sized compromises but may be applied to other categories as well. According to another embodiment of the present invention, the drilldown process may monitor the usage of contact data for indicating a risk level on a compromise account. For example, an embodiment of the present invention may identify that for accounts that have been compromised, an increased number of calls have occurred. This activity supports the scenario where the fraudster is making calls on the account to obtain additional information about the account, card holder, etc. According to another example, an embodiment of the present invention may identify the time period (e.g., number of days, number of hours, etc.) between a contact and a first fraud transaction. For example, the contact may include a call to VRU (voice recognition unit) and/or other action. An embodiment of the present invention may observe whether the fraudster talked to an advisor, the type of contact, originating number, whether the zip code matched, whether the area code matched, and/or other indicators. An embodiment of the present invention recognizes that a counterfeit type of fraud that manufactured a fraudulent card product will have a different time period between the first fraud transaction and a contact. This data provides indicators useful for assessing risk levels and identifying appropriate mitigation strategies.

An embodiment of the present invention relates to a system and method for detecting probes. Probes may be used by fraudsters to test a compromised card product or other compromised data. In other words, a probe may determine whether compromised data is valid and usable by the fraudster. Card products and/or other data that has been probed are generally verified and worth more to fraudsters. For example, fraudsters can advertise that the account has been tested and can therefore sell the account information at a higher price. An embodiment of the present invention recognizes that a probe check may be a precursor to fraud usage.

Probes may be categorized as parasitic probes or pure probes. Parasitic probes may involve an abused merchants. For example, a fraudster may build an interface, such as a graphical user interface (GUI), on top of a website to perform a probe test. Such websites may be static, with little change. Examples include online newspaper websites, music download websites and any website that can support a high volume of small dollar transactions.

Pure probes may involve a fraudster created mechanism to process authorizations while posing as a merchant. For example, an authorization may be transmitted using the mechanism built into the acquirer to send an authorization request to approval a low dollar amount transaction. If the transaction is approved, the account is in good standing. Fraudsters will not want the probe transaction to be posted to the card holder's account because doing so will alert the customer of the fraud performed on the card. Probe transactions are usually of low dollar amount so as not to alert the card holder. In addition, the fraudster may cancel the transaction so as to avoid posting to the card holder's account. In this pure probe example, the merchant information may rapidly change. For example, the probe abuser may submit different merchant names, different merchant numbers, different locations, etc. The probe abuser may also use an existing legitimate merchant name or identifier. Other categorizes or types of probes may be recognized.

Probes may involve a transaction to check the accuracy of the compromised data. Some characteristics indicative of a probe may involve one or more of the following: low dollar amount, non-posted transaction, high fraud rates on an account level that occurs after the particular probe, multiple merchant names processed against a single merchant identifier, and/or other factors. Also, a rapidly changing merchant or method may be indicative of a probe where multiple names, multiple merchant identifiers, changing SIC codes, changing merchant category codes, city and state may be observed.

An embodiment of the present invention identifies merchants that fit the probe characteristics. For example, an online newspaper website may allow users to manage their monthly newspaper subscription. Probsters may test transactions on this type of website. An embodiment of the present invention may recognize that the website has high account fraud rates, no or very few posted transactions and most of the dollar amounts are very small. For example, account fraud rate may be 50%, which means that one in every two accounts that has an online newspaper website probe will go fraud within the next 30 days. By recognizing that the accounts have been probed, the risk level may be adjusted to be higher on those accounts.

Mitigation Module 250 may identify and apply an appropriate mitigation action to the detected data compromise. For example, the mitigation action may include one or more of the following: decline transaction, queue strategy analysis, card watch status, reissue with expiration date change only, proactive close and reissue, account compromise management process (ACMP) queue, block and reissue, follow-up with internal and external law enforcement, etc. Other mitigation action(s) may be applied. Also, Mitigation Module 250 may assess the compromise and apply an appropriate action. For a compromise involving a small size and high risk, a close and reissue action may be applied. For a compromise involving a medium size with high risk, close and reissue action may be applied. For a compromise involving a large size and low risk, a monitoring action may be applied.

Termination Module 260 may identify and/or apply a recommended action based on the analysis performed on the data compromise. An embodiment of the present invention provides for a more thorough investigation that will allow for better linking of accounts to ensure high risk accounts are properly identified and appropriate actions are taken (e.g., SARs are filed correctly). Moreover, earlier detection may lead to lower losses and damages.

Figure 3:
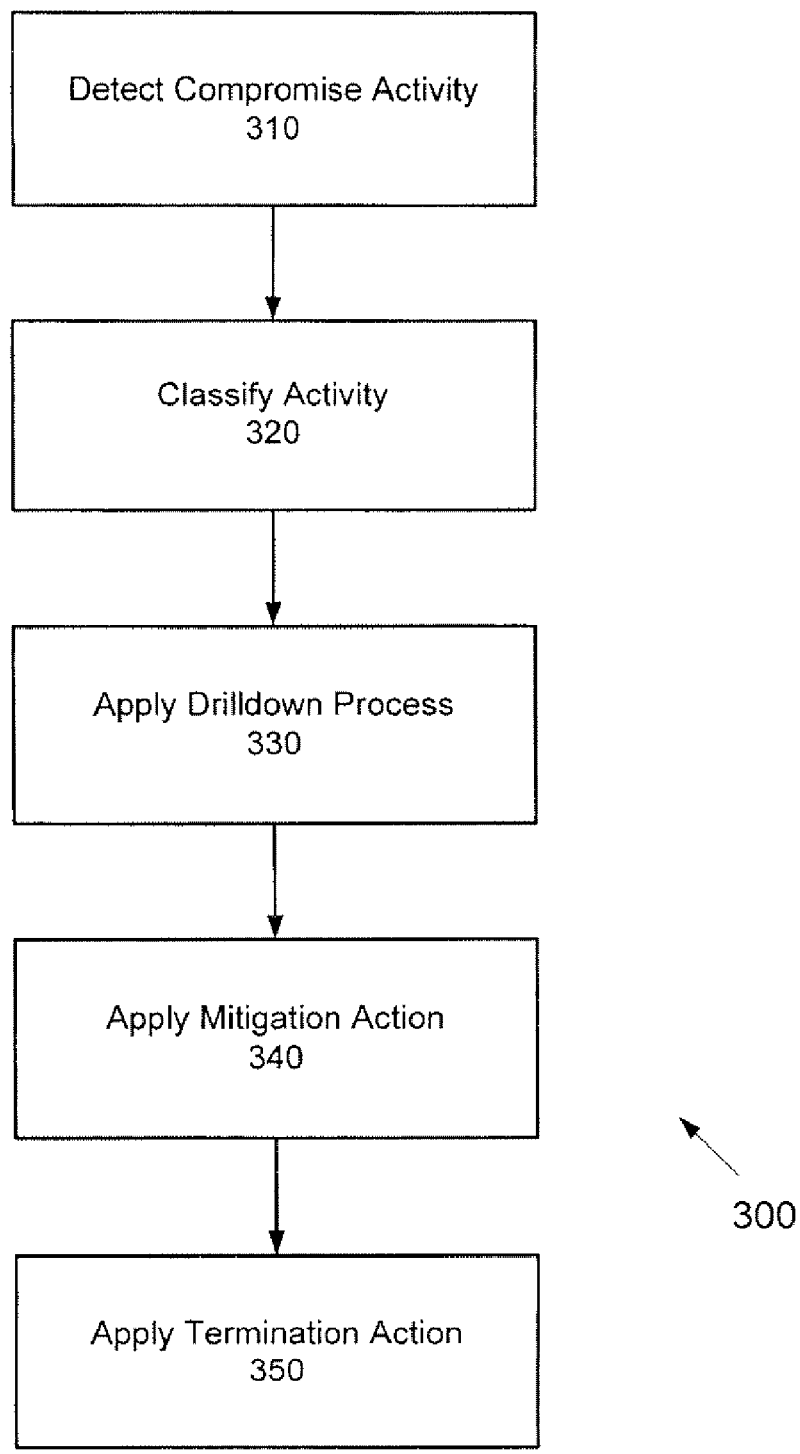
FIG. 3 is an exemplary flowchart illustrating a method for identifying data compromises, according to an embodiment of the present invention.

FIG. 3 is an exemplary flowchart illustrating a method for identifying data compromises 300, according to an embodiment of the present invention. At step 310, data compromises and/or other activity indicative of a fraud or potential fraud may be monitored for data compromise detection. At step 320, the detected activity may be classified based on various factors. At step 330, a drilldown process may be applied to the detected activity for detailed analysis. At step 340, an appropriate mitigation action may be applied. At step 350, an appropriate termination action may be applied. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, data compromises and/or other activity indicative of a fraud or potential fraud may be monitored for data compromise detection. External sources may provide information used for detecting a data compromise. External sources may include card associations, such as VISA, Mastercard, etc., industry sources, fraud investigations, global security and investigations alerts. Manual review of accounts may also be used to assist in identifying data compromises. An embodiment of the present invention may provide proactive compromise detection reports. Exemplary reports may include merchant compromise reports, region compromise reports and acquirer compromise reports. Other compromise detection reports may also be provided.

At step 320, the detected activity may be classified based on various factors. For example, the detected activity may be classified based on number of cards compromised, severity level, fraud loss type on impacted accounts, card-present, card-not-present and/or other factors. Fraud usage analysis may also be considered. For example, merchant type, merchant geography, transaction type, valid card verification value (CVV), valid card verification code and/or other data may be applied. Also, card associations publish compromise account management system (CAMS) alerts and details.

At step 330, a drilldown process may be applied to the detected activity for detailed analysis. For example, credit line, bank identification number (BIN), supersegment (e.g., product or partner affiliated entities, etc.), probe activity, strategic business unit (SBU) (e.g., mass affluence, high net worth, business cards, retail, etc.), card member geography, age of account, internal fraud investigation group (e.g., FOOTPRINTS) and/or other data may be applied. The drilldown process may also consider high credit line accounts (e.g., credit line accounts over $100,000 credit line), private bank accounts, etc. Also, an embodiment of the present invention may also consider voice recognition unit (VRU) calls with information mismatch (e.g., zip code, area code, calling number, etc.), high fraud rate Automatic Number Identification (ANI) calls, etc. As part of the drilldown process, probe checks may also be performed.

At step 340, an appropriate mitigation action may be applied. For example, based on the classification and/or drilldown process, an appropriate mitigation action may be applied to the detected data compromise. According to another example, the mitigation action may include one or more of the following: decline transaction, queue strategy analysis, card watch status, reissue with expiration date change only, proactive close and reissue, account compromise management process (ACMP) queue, block and reissue, etc. Other mitigation action(s) may be applied.

An embodiment of the present invention may apply a specific response to a detected probe activity. For example, an embodiment of the present invention may apply an appropriate action, such as contact the customer about the account, decline the probe, contact a card association and inform them about the probe activity, monitor the probe activity and/or other action. According to another example, an embodiment of the present invention may contact the customer to inquire whether a valid transaction has been made. If not, an embodiment of the present invention may then reissue the card to the customer. An embodiment of the present invention may target the probes and decline these probe transactions. By doing so, the fraudsters will become frustrated and move on to a different target. For example, the particular probe may be identified as having mismatched information where address information has not been verified. In response, the probe transaction may be declined. An embodiment of the present invention may also concurrently contact an appropriate card association and identify a possible breach. If the merchant and card association are affected, most, if not all, transactions may be declined. In addition, an embodiment of the present invention may monitor the probing activity and gain more information about the probing activity.

At step 350, an appropriate termination action may be applied. Termination actions may include monitor loss(es), post implementation review, action/strategy modification, SAR filing, charge back from card association, VISA, Mastercard, etc. Other termination action(s) may be applied. For example, manual review may involve analysis by a trained individual. Automated actions may include usage monitoring, law enforcement involvement, changes to account settings, tracking, automated SAR filing, authority reporting for illegal and/or other activity. An embodiment of the present invention facilitates case display for law enforcement to follow and act on.

Figure 4:
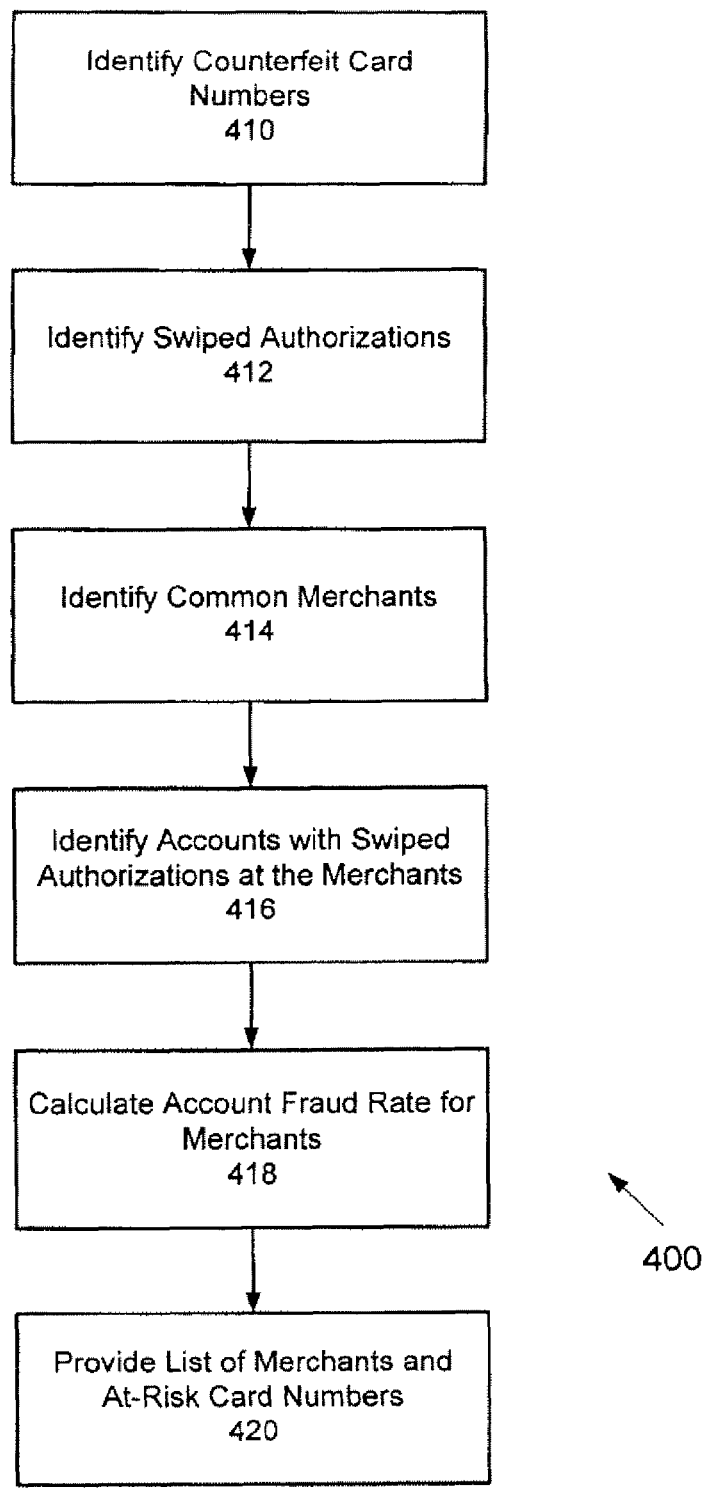
FIG. 4 is an exemplary flowchart illustrating a method for detecting merchant compromises, according to an embodiment of the present invention.

FIG. 4 is an exemplary flowchart illustrating a method for detecting merchant compromises 400, according to an embodiment of the present invention. At step 410, a list of counterfeit card members may be identified. At step 412, swiped or card-present authorizations for a prior predetermined number of days may be identified. At step 414, common merchants may be identified where the swiped or card-present authorizations occurred. One or more filters may be applied to this data. At step 416, accounts with swiped or card-present authorizations at the merchants may be identified for the prior predetermined number of days. At step 418, an account fraud rate may be calculated for the identified merchants. At step 420, a list of merchants and "at risk" card numbers with an account fraud rate above a predetermined floor may be identified. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

A merchant compromise generally refers to a compromise occurring at a merchant. For example, an employee or other individual may access data stored at a merchant location or otherwise associated with a merchant. In this example, an employee at a merchant store may take information, such as card number, account number, etc., stored at the merchant location. The employee may then produce counterfeit cards or other fraudulent data and/or products. An embodiment of the present invention may recognize fraud activity on these cards. By running a merchant compromise report based on a prior time period (e.g., prior 90 days), an embodiment of the present invention may run site transactions on the cards and identify common merchants. One or more filters may be applied to the common merchants. For example, merchants with card transactions of less than 10 may be ignored. The report may include a list of merchants for a certain time period where those identified counterfeit cards were used. Fraud rates may be used to identify high risk merchants.

According to this exemplary embodiment, merchant compromises may include accounts tagged as counterfeit fraud. At step 410, a list of counterfeit card members may be identified. An embodiment of the present invention may identify a list of counterfeit card numbers with swiped or card-present fraud transactions setup during a time period, such as the last 45 days. Other time periods may be applied.

At step 412, swiped or card-present authorizations for a prior predetermined number of days may be identified. From the list of counterfeit card members, an embodiment of the present invention may identify swiped or card-present authorizations for a time period, such as prior 90 days, prior to the fraud transaction date. Other time periods may be applied.

At step 414, common merchants may be identified. An embodiment of the present invention may then identify common merchants where the swiped or card-present authorizations occurred. One or more filters may be applied to this data. According to an exemplary application, merchants with a lower number of fraud accounts may be ignored. For example, merchants with less than 10 fraud accounts may be ignored. Other thresholds may be applied.

At step 416, accounts with swiped or card-present authorizations at the merchants may be identified. For example, an embodiment of the present invention may identify accounts with swiped or card-present authorizations at the merchants in the 90 days prior to fraud setup to calculate an account fraud rate. Other time periods may be applied.

At step 418, an account fraud rate may be calculated for the identified merchants. For example, an account fraud rate may represent a number of counterfeit fraud accounts as compared to total accounts transacted at the merchant. Other representations or indications of fraud may be implemented and considered. An embodiment of the present invention may be directed to analyzing fraud rate after a fraud transaction to assess merchant risk levels. For example, for a group of customers who made transactions at a specific merchant, an embodiment of the present invention may calculate fraud rate over a period of time after the merchant visits. If the fraud rate is considered to be high, it may indicate a common point of compromise. It may also indicate that the merchant is being probed or tested by fraudsters.

At step 420, a list of merchants and "at risk" card numbers with an account fraud rate above a predetermined floor may be identified. An embodiment of the present invention may provide a listing of compromised merchant identifiers and "at risk" card numbers with an account fraud rate meeting a predetermined criteria. For example, the list of merchants may include card numbers with an account fraud rate above and/or equal to a predetermined minimum percentage, such as 2%. Other criteria may be applied. The listing of merchants may be validated for historical data and merchant compromises published by associations and/or data from other sources.

FIG. 5 is an exemplary interface illustrating a merchant compromise detection report, according to an embodiment of the present invention. As shown in FIG. 5, merchant compromise detection may be further analyzed to identify and address data compromises. In this exemplary application, data may include Merchant Identifier 512, Merchant Location 514, Sales Card Count 516, Fraud Card Count 518, Fraud Loss 520, Average Fraud Loss 522, Account Fraud Rate 524. Average Fraud Loss 522 may represent Fraud Loss divided by Fraud Card Count. Account Fraud Rate 524 may represent Fraud Card Count divided by Sales Card Count. Other forms of data may also be displayed.

Figure 6:
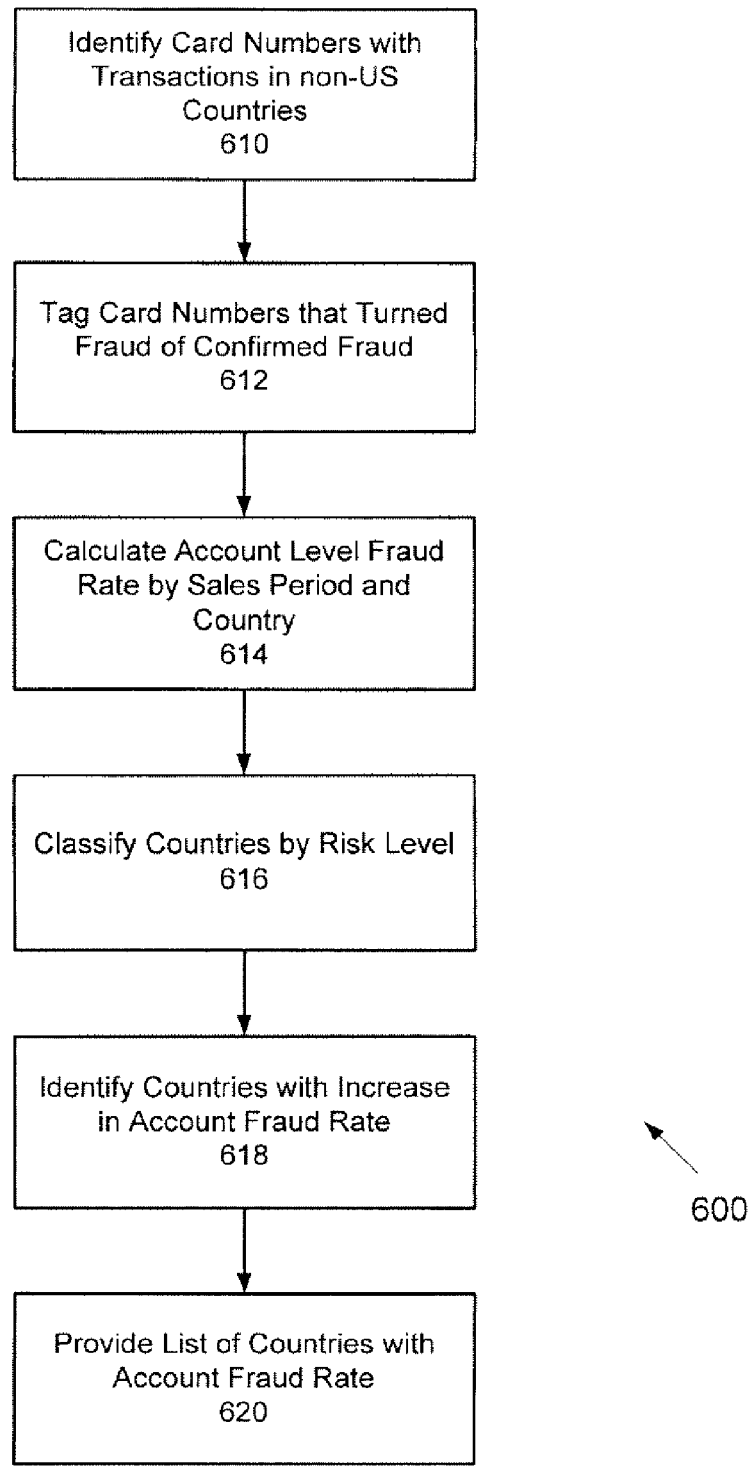
FIG. 6 is an exemplary flowchart illustrating a method for detecting region compromises, according to an embodiment of the present invention.

FIG. 6 is an exemplary flowchart illustrating a method for detecting region compromises 600, according to an embodiment of the present invention. At step 610, a list of card numbers with transactions in non-US countries for each month during a predetermined time period may be identified. At step 612, card numbers that turned fraud or confirmed fraud in the next predetermined number of days may be tagged. At step 614, account level fraud rate by sales period (e.g., sales month, etc.) and region or country may be identified. At step 616, countries may be classified into risk levels, such as high, medium and low, based on the number of fraud accounts per month. At step 618, countries with an increase in account fraud rate on a month to month basis may be identified. At step 620, a list of countries with account fraud rate by month for the predetermined time period may be identified. The order illustrated in FIG. 6 is merely exemplary. While the process of FIG. 6 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 610, a list of card numbers with transactions in one or more regions (e.g., non-US countries) for each month during a predetermined time period may be identified. An embodiment of the present invention may identify a list of card numbers that have transacted in various non-U.S. countries each month for the past one year. Other time periods may be applied. Some accounts may appear in different months and different countries for the same month (or other time period). Other regions, including territory, a country, multiple countries, and/or other area, may be identified.

At step 612, card numbers that turned fraud or confirmed fraud in the next predetermined number of days may be tagged. For example, card numbers that turned fraud or confirmed fraud in the next 180 days may be tagged. Other time periods may be applied.

At step 614, account level fraud rate by sales month and region (e.g., territory, country, multiple countries, etc.) may be identified. For example, an account fraud rate may represent a number of counterfeit fraud accounts as compared to total accounts for a time period. This information may be further compared to normalized account rates over a period of time.

At step 616, regions or countries may be classified into risk levels, such as high, medium and low, based on the number of fraud accounts per month. In addition, an embodiment of the present invention may identify an increase of fraud rate for a time period. Other time periods may be applied.

At step 618, regions or countries with an increase in account fraud rate on a month to month basis may be identified. An embodiment of the present invention recognizes that countries with an increase in account fraud rate month over month are in a compromise and exposure time period of compromise starts from the month first showing an increase in the rate.

At step 620, a list of regions or countries with account fraud rate by month for the predetermined time period may be identified. An embodiment of the present invention may provide a display with a list of regions or countries with account fraud rate by month for the past one year. Other time periods may be applied.

FIG. 7 is an exemplary interface illustrating a region compromise detection report, according to an embodiment of the present invention. As shown in FIG. 7, region compromise detection may be further analyzed to identify and address data compromises. In this exemplary application, data may include Region risk group 710, Region 712, Sales Month 714, Fraud Indicator 716, Grand Total 718 and Account Fraud Rate 720. For Fraud indicator 716, "0" indicates no fraud while "1" indicates fraud at the account level. The Account Fraud Rate 720 may represent the number of fraud accounts as compared to the total number of accounts. Other forms of data may also be displayed.

Figure 8:
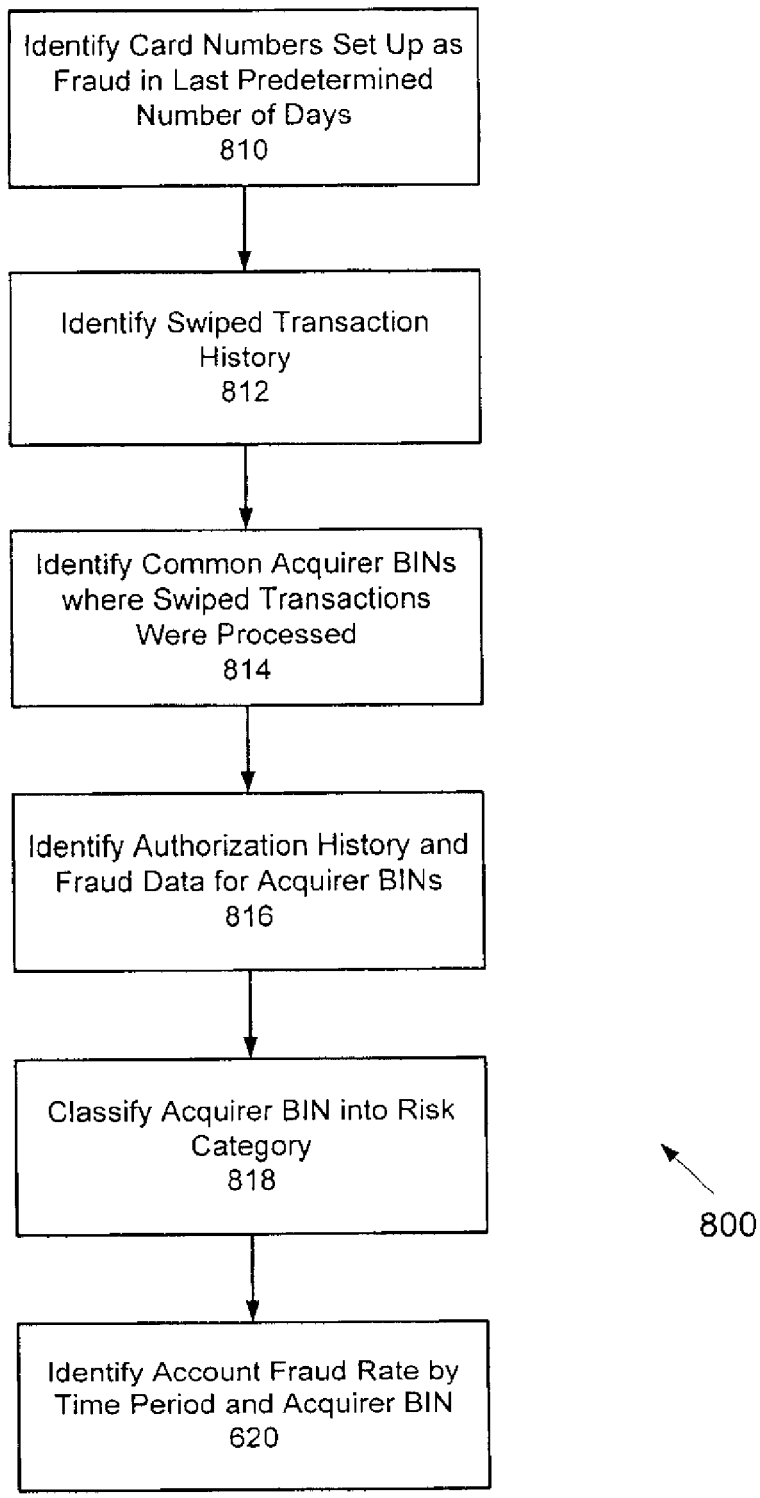
FIG. 8 is an exemplary flowchart illustrating a method for detecting acquirer compromises, according to an embodiment of the present invention.

FIG. 8 is an exemplary flowchart illustrating a method for detecting acquirer compromises 800, according to an embodiment of the present invention. At step 810, a list of card numbers setup as fraud during a time period may be identified. At step 812, swiped or card-present transaction history for prior number of days may be identified. At step 814, common acquirers BINs (Bank Identifier Number) where swiped or card-present transactions were processed may be identified. One or more filters may be applied. At step 816, authorization history and fraud data for a time period, such as five months, on acquirer &Ns may be identified. At step 818, acquirer BIN may be classified by risk level, such as high, medium and low risk, by number of total fraud account during the time period, such as five months. At step 820, a report displaying account fraud rate by month and acquirer BIN may be provided. The order illustrated in FIG. 8 is merely exemplary. While the process of FIG. 8 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 810, a list of card numbers setup as fraud during a time period may be identified. An embodiment of the present invention may identify a list of card numbers setup as fraud in the last 90 days. Other time periods may be applied.

At step 812, swiped or card-present transaction history for prior number of days may be identified. An embodiment of the present invention may identify swiped or card-present transaction history for prior 180 days.

At step 814, common acquirers BINs (Bank Identifier Number) where swiped or card-present transactions were processed may be identified. One or more filters may be applied. For example, the BINs with less than 50 accounts processed may be ignored. Other filters or criteria may be applied.

At step 816, authorization history and fraud data for a time period, such as five months, on acquirer BINs may be identified. An embodiment of the present invention may identify authorization history and fraud data for five months on all acquirer BINs. A time period, such as 60 days prior to current, may be applied to allow for fraud tagging or fraud confirmation. The time period provides for confirmation of fraud, whether the customer is called to confirm fraudulent activity or the customer reports fraudulent activity.

At step 818, acquirer BIN may be classified by risk level, such as high, medium and low risk, by number of total fraud account during the time period, such as five months. Other categories of risk may be applied.

At step 820, a report displaying account fraud rate by month and acquirer BIN may be provided.

FIG. 9 is an exemplary interface illustrating an acquirer compromise detection report, according to an embodiment of the present invention. As shown in FIG. 9, acquirer compromise detection may be further analyzed to identify and address data compromises. In this exemplary application, data may include Acquirer Bin Number 910, Account Fraud Rate 912 and Number of Fraud Accounts 914. Other forms of data may also be displayed.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 110 may be stored and cataloged in Database 140 which may comprise or interface with a searchable database. Database 140 may comprise, include or interface to a relational database. Other databases, such as a query format database, a Standard Query Language (SQL) format database, a storage area network (SAN), or another similar data storage device, query format, platform or resource may be used. Database 140 may comprise a single database or a collection of databases, dedicated or otherwise. In one embodiment, Database 140 may store or cooperate with other databases to store the various data and information described herein. In some embodiments, Database 140 may comprise a file management system, program or application for storing and maintaining data and information used or generated by the various features and functions of the systems and methods described herein. In some embodiments, Database 140 may store, maintain and permit access to customer information, transaction information, account information, and general information used to process transactions as described herein. In some embodiments, Database 140 is connected directly to Processor 110, which, in some embodiments, it is accessible through a network, such as communication network, e.g., 122, 124, 126 illustrated in FIG. 1, for example.

Communications network, e.g., 122, 124, 126, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network, e.g., 122, 124, 126, may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 122, 124, 126, may comprise a satellite communications network, such as a direct broadcast communication system (DBS) having the requisite number of dishes, satellites and transmitter/receiver boxes, for example. Communications network, e.g., 122, 124, 126, may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 110 may include any terminal (e.g., a typical home or personal computer system, telephone, personal digital assistant (PDA) or other like device) whereby a user may interact with a network, such as communications network, e.g., 122, 124, 126, for example, that is responsible for transmitting and delivering data and information used by the various systems and methods described herein. Processor 110 may include, for instance, a personal or laptop computer, a telephone, or PDA. Processor 110 may include a microprocessor, a microcontroller or other general or special purpose device operating under programmed control. Processor 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 110 may also include a network-enabled appliance, a browser-equipped or other network-enabled cellular telephone, or another TCP/IP client or other device.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to identifying fraudulent activities, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method for detecting one or more data compromises, wherein the method is executed by a programmed computer processor which communicates with a user via a network, the method comprising the steps of:
   detecting, via a computer processor, an activity indicative of a data compromise based at least in part on a compromise detection report involving at least one of merchant compromise report, region compromise report and acquirer compromise report, wherein the compromise detection report is generated by an automated detection algorithm using account data associated with at least one merchant;
   classifying, via a computer processor, the activity based on a combination of risk level, size of data compromise and fraud severity; and
   identifying a specific mitigation response to the activity through an interface.

2. The method of claim 1, further comprising the step of:
   determining whether one or more accounts associated with the activity have been probed by a fraudster to determine if the one or more accounts are valid.

3. The method of claim 1, wherein the merchant compromise report identities one or more common merchants where authorizations were swiped with one or more counterfeit cards.

4. The method of claim 3, wherein an account fraud rate is calculated for each common merchant, wherein the account fraud rate represents a number of counterfeit fraud accounts as compared to a total of accounts transacted at a merchant.

5. The method of claim 1, wherein the merchant compromise report identifies merchant identifier, sales card count, fraud card count, fraud loss and account fraud rate.

6. The method of claim 1, wherein the region compromise report identifies one or more non-U.S. countries having an increase in account fraud rate for a predetermined time period.

7. The method of claim 6, wherein one or more card transactions that have turned fraud during a predetermined time period occurred in the identified one or more countries.

8. The method of claim 1, wherein the region compromise report identifies region risk group, one or more non-U.S. countries, fraud indicator and account fraud rate.

9. The method of claim 1, wherein the acquirer compromise report identities one or more common acquirers with authorizations involving one or more fraud card numbers.

10. The method of claim 1, wherein the acquirer compromise report identifies acquirer identifier, sales time period and fraud data.

11. An automated computer implemented system for detecting one or more data compromises, the system comprising:
- a detection module, comprising a computer processor, configured to detect an activity indicative of a data compromise based at least in part on a compromise detection report involving at least one of merchant compromise report, region compromise report and acquirer compromise report, wherein the compromise detection report is generated by an automated detection algorithm using account data associated with at least one merchant;
- a classification module, comprising a computer processor, configured to classify the activity based on a combination of risk level, size of data compromise and fraud severity; and
- a mitigation module, comprising a computer processor, configured to identify a specific mitigation response to the activity through an interface.

12. The system of claim 11, wherein whether one or more accounts associated with the activity have been probed by a fraudster is assessed to determine if the one or more accounts are valid.

13. The system of claim 11, wherein the merchant compromise report identifies one or more common merchants where authorizations were swiped with one or more counterfeit cards.

14. The system of claim 13, wherein an account fraud rate is calculated for each common merchant, wherein the account fraud rate represents a number of counterfeit fraud accounts as compared to a total of accounts transacted at a merchant.

15. The system of claim 11, wherein the merchant compromise report identifies merchant identifier, sales card count, fraud card count, fraud loss and account fraud rate.

16. The system of claim 11, wherein the region compromise report identifies one or more non-U.S. countries having an increase in account fraud rate for a predetermined time period.

17. The system of claim 16, wherein one or more card transactions that have turned fraud during a predetermined time period occurred in the identified one or more countries.

18. The system of claim 11, wherein the region compromise report identifies region risk group, one or more non-U.S. countries, fraud indicator and account fraud rate.

19. The system of claim 11, wherein the acquirer compromise report identities one or more common acquirers with authorizations involving one or more fraud card numbers.

20. The system of claim 11, wherein the acquirer compromise report identifies acquirer identifier, sales time period and fraud data.

21. An automated computer implemented method for detecting one or more data compromises, wherein the method is executed by a programmed computer processor which communicates with a user via a network, the method comprising the steps of:
- detecting, via a computer processor, an activity indicative of a data compromise based at least in part on a compromise detection report involving at least one of merchant compromise report, region compromise report and acquirer compromise report, wherein the compromise detection report is generated by an automated detection algorithm using account data associated with at least one merchant;
- determining, via a computer processor, whether one or more accounts associated with the activity have been probed by a fraudster to determine if the one or more accounts are valid;
- classifying, via a computer processor, the activity based on a combination of risk level, size of data compromise and fraud severity; and
- identifying, via a computer processor, a specific mitigation response to the activity through an interface;
- wherein the merchant compromise report identities one or more common merchants where authorizations were swiped with one or more counterfeit cards; wherein an account fraud rate is calculated for each common merchant, wherein the account fraud rate represents a number of counterfeit fraud accounts as compared to a total of accounts transacted at a merchant;
- wherein the region compromise report identifies one or more non-U.S. countries having an increase in account fraud rate for a predetermined time period; wherein one or more card transactions that have turned fraud during a predetermined time period occurred in the identified one or more countries; and
- wherein the acquirer compromise report identities one or more common acquirers with authorizations involving one or more fraud card numbers.

* * * * *